United States Patent [19]
Vallet

[11] Patent Number: 4,656,648
[45] Date of Patent: Apr. 7, 1987

[54] PROCESS FOR THE NONCOHERENT DEMODULATION OF A DIGITAL SIGNAL

[76] Inventor: Robert Vallet, 14 rue des Fougéres, 911130 Rés Orangis, France

[21] Appl. No.: 691,080

[22] PCT Filed: May 4, 1984

[86] PCT No.: PCT/FR84/00123
§ 371 Date: Jan. 9, 1985
§ 102(e) Date: Jan. 9, 1985

[87] PCT Pub. No.: WO84/04640
PCT Pub. Date: Nov. 22, 1984

[30] Foreign Application Priority Data
May 9, 1983 [FR] France .................. 83 07711

[51] Int. Cl.⁴ .................................... H04L 27/22
[52] U.S. Cl. ......................... 375/80; 375/83; 375/86; 375/90; 375/94; 371/43
[58] Field of Search .............. 375/39, 47, 80, 83, 375/86, 90, 94; 371/43; 364/715, 735

[56] References Cited
U.S. PATENT DOCUMENTS
4,087,752  5/1978  Melvin ................................ 375/86
4,087,787  5/1978  Acampora .......................... 371/43

Primary Examiner—Robert L. Griffin
Assistant Examiner—M. Huseman
Attorney, Agent, or Firm—Oblon, Fisher, Spivak, McClelland & Maier

[57] ABSTRACT

The present invention relates to a process for the noncoherent demodulation of a linearly modulated digital signal with energy by constant symbol and a demodulator for performing this process. The process consists of demodulating a linearly modulated signal by a sequence of information symbols $a_0, \ldots, a_{N-1}$ to which has been added a Gaussian white noise. The signal received is processed by the demodulator in order to obtain sequences of blocks of L data, containing all the information of the received signal. By means of a recursive algorithm, from said data is deduced a sequence of symbols $a_0, \ldots, a_{N-1}$, maximizing an approximate probability function. The invention more particularly applies to satellite links and to vehicle radio communications.

10 Claims, 6 Drawing Figures

PROCESS FOR THE NONCOHERENT DEMODULATION OF A DIGITAL SIGNAL

BACKGROUND OF THE INVENTION

The present invention relates to a process for the noncoherent demodulation of a linearly modulated signal where each symbol $a_k$ has the same energy and a demodulator for performing this process. It is more particularly used in satellite links and in vehicle radio communications.

A digital signal x(t), in which t is a time variable, is generally a narrow band signal centered about a frequency $f_0$ called the carrier frequency and of band width B. It is therefore a signal, whose spectral density is zero outside the frequency spacing, $[f_0-B/2, f_0+B/2]$.

In signal theory, it is standard practice to represent this digital signal by its complex envelope $\alpha(t)$, the relation between x(t) and $\alpha(t)$ being given by the equation $$x(t) = Re(\alpha(t) \cdot e^{jw_0 t})$$

in which Re signifies "real part of", e signifies exponential and j is a complex number, such as $j^2 = -1$ and $w_0$ is the ripple corresponding to the frequency $f_0$. As the complex representation permits a clearer definition, it will be used throughout the remainder of the text.

Consideration will be given to a sequence of N symbols $a_0, \ldots, a_k, \ldots, a_{N-1}$ where k is an integer and where each $a_k$ represents an information to be transmitted, where N equals approximately 64. These symbols are elements of an e.g. binary alphabet A. For minimizing the error rate in transmitting the sequence of symbols $a_0 \ldots a_{N-1}$, it is standard practice to encode this sequence into another sequence of symbols $\alpha_0 \ldots \alpha_{N-1}$ in which each symbol of said other sequence belongs to another alphabet $\alpha$, which is e.g. of the M-type, in which M is an integer.

This sequence of symbols $\alpha_0 \ldots \alpha_{N-1}$ will effectively be transmitted by a modulated signal, the modulation being realized by the said signals. In the case of a linear modulation, the complex envelope $\alpha(t)$ of the modulated signal x(t) containing the information to be transmitted is then represented by the expression $$\sum_{k=0}^{N-1} \alpha_k \cdot g(t - kT)$$

in which T is the time interval between the transmission of two successive symbols and g(t) is a function, with real or complex values, describing the pulse response of all the emission filters so that $|\alpha_k|^2 = 1$ and $$\int_{-\infty}^{-\infty} |g(t)|^2$$

dt, equal to $E_b$ is the energy per bit.

FIG. 1 is a diagrammatic representation illustrating the known chain of modulation, transmission and demodulation of symbols $a_0 \ldots a_{N-1}$, which are sequentially received in a modulator 2. They follow one another spaced by a time interval T. The modulator 2 comprises a coding means 4 supplying at the output the sequence of symbols $\alpha_0 \ldots \alpha_{N-1}$, which are spaced from one another by a time interval T. It also comprises a modulation means 6, which supplies the complex envelope $\alpha(t)$ in the form of its real part, $Re(\alpha(t))$ and its imaginary part $Im(\alpha(t))$. These two signals are frequency inverted by respectively modulating a signal cos ($w_0 t$) supplied by an oscillator 8 and a signal $-\sin(w_0 t)$ supplied by a phase shifter 10, which is connected by the input to oscillator 8. The two resulting modulated signals are summated and their sum constitutes the emitted signal x(t).

This emitted signal x(t) during transmission, is subject to disturbances, represented by the addition of a Gaussian white noise b(t) of bilateral spectral density $N_0/2$ in watt/hertz. Thus, demodulator 12 receives a signal y(t) equal to x(t)+b(t), which is frequency reinverted by modulating a first signal 2. cos ($w_0 \cdot t + \theta(t)$) from an oscillator 14 and a second signal $-2. \sin(w_0 \cdot t + \theta(t))$ supplied by a phase shifter 16, which is connected to the same oscillator 14. The phase $\theta(t)$ of the signals is now known in the case of a non-coherent demodulation, but its variation is slow compared with the binary flow rate of transmission. The modulated signals are respectively designated Re(r(t)) and Im(r(t)). These are the real and imaginary components of the complex envelope r(t) of the signal y(t). These signals are filtered by a matched filtering means 18 of pulse response g($t_0$−t), in which $t_0$ is a quantity characterizing the transmission time of the signal all along the chain. A means 20 then samples these signals and supplies at the output the real part $Re(r_k)$ and imaginary part $Im(r_k)$ of the observation $r_k$ in which $0 \leq k \leq N-1$. This means 20 performs a sampling at dates separated by a time interval T.

The observations $r_0 \ldots r_{N-1}$ are sequentially applied to the input of a calculating or computing means 22, which supplies at the output a sequence of symbols $\hat{\alpha}_0 \ldots \hat{\alpha}_{N-1}$ which represent the most probable estimated values of the symbols $\alpha_0 \ldots \alpha_{N-1}$ emitted, bearing in mind the observations $r_0 \ldots r_{N-1}$. If the transmission of the symbols $\alpha_0 \ldots \alpha_{N-1}$ is perfect, the symbols $\hat{\alpha}_0 \ldots \hat{\alpha}_{N-1}$ are respectively identical to said symbols $\alpha_0 \ldots \alpha_{N-1}$. The sequence of symbols $\alpha_0 \ldots \alpha_{N-1}$ obtained is then decoded by a decoding means 24, which supplies a sequence of symbols $\hat{a}_0 \ldots \hat{a}_{N-1}$. The latter are respectively identical to the symbols $a_0 \ldots a_{N-1}$, if the transmission is perfect.

The demodulation performed is said to be noncoherent if the phase $\theta(t)$ of the signal emitted by oscillator 14 is not known. This is particularly the case if this oscillator is free, i.e. if it is not dependent on the signal received y(t).

In general terms, the demodulation, i.e. the determination of the most probable sequence of symbols $\hat{\alpha}_0 \ldots \hat{\alpha}_{N-1}$ minimizes the error rate on reception, if the symbols emitted are equiprobable. It is known from the article "Optical Reception of Digital Data over the Gaussian Channel with Unknown Delay and Phase Jitter" by David D. Falconer, which appeared in IEEE Transactions on Information Theory, January 1977, pp. 117-126, that the probability function in coherent reception maximizes:

$$Re\left( \int_0^{NT} r^*(t) \cdot e^{j\theta(t)} \cdot \hat{\alpha}(t, \hat{\alpha}_0 \ldots \hat{\alpha}_{N-1}) \cdot dt \right)$$

as a function of the symbols $\hat{\alpha}_0 \ldots \hat{\alpha}_{N-1}$, in which r*(t) is the conjugate complex of r(t) and in which $\theta(t)$ characterized the phase introduced by the transmission channel.

This maximization cannot be performed in the case of a coherent demodulation in which $\theta(t)$ is a known function of the receiver, which can thus be assumed as zero. In the case of a noncoherent demodulation, it can be maximized if it assumed, and this is a reasonable hypothesis, that $\theta(t)$ is constant over the time interval $[0,NT]$ and is considered by the receiver as a random variable equally distributed on $[0,2\pi]$ said constant being unknown to the receiver. It is known that the quantity maximized is then $$\left| \int_0^{NT} r^*(t) \cdot (t, \hat{a}_0, \ldots, \hat{a}_{N-1}) \cdot dt \right|^2$$

By replacing $a(t, \hat{a}_0, \ldots, \hat{a}_{N-1})$ by $$\sum_{k=0}^{N-1} \hat{a}_k \cdot g(t - kT), \text{ and setting } r_k = \int_0^{NT} r^*(t) \cdot g(t - kt) \cdot dt$$

and on noting that the square of the absolute value of a complex number is equal to the product of this complex number by its conjugate, it is possible to replace the quantity to be maximized by the equivalent quantity $$\sum_{k=0}^{N-1} a_k \cdot r_k \cdot \left( \sum_{l=0}^{N-1} a_l \cdot r_l^* \right)$$

The receiver or demodulator determining the sequence of symbols $\hat{a}_0 \ldots, \hat{a}_{N-1}$ maximizing this quantity is said to be optimum in the sense of the probability maximum. In practice, the maximization is of a rising complexity with N (the calculation number rises as $2^N$) and for N higher than about 10, it is not known how this expression can be solved in a simple manner.

Several methods are known which make it possible to obtain a suboptimum receiver. It is possible to choose an observation window formed by a single symbol (N=1). This leads to the conventional noncoherent receiver, more particularly used in low speed modems, which observe the signal symbol by symbol.

A noncoherent receiver using a two symbol observation window is also known. in the case of phase shift keying (PSK), this receiver is the conventional differential receiver.

A noncoherent receiver using an observation window of two 2P+1 symbols, in which P is an integer, is known for determining the central symbol. This method described in the article "Coherent and noncoherent detection of CPDSK" by W. P. Osborne and M. B. Luntz, which appeared in IEEE Transactions on Communications, vol. COM-22, no. 8, August 1974, pp. 1023-1036 leads to a receiver which cannot be produced, because the probability function is not expressed in a simpler manner as a function of the observation.

SUMMARY OF THE INVENTION

The present invention obviates the deficiencies of known receivers by using a simpler approximate function of the probability function, which can be maximized in a recursive manner. This method is particularly suitable for the transmission of blocks of symbols of considerable length (N=64 for example). The receiver associated with this function has very good performance characteristics in the sense of the error rate.

The invention more particularly consists of modifying the quantity to be maximized referred to hereinbefore in such a way as to easily find a sequence $\hat{a}_0, \ldots, \hat{a}_{N-1}$ maximizing the same. In particular, the quantity to be maximized is replaced by the quantity $V(\hat{a}_0, \ldots, \hat{a}_{N-1})$ equal to $$Re \left( \sum_{k=0}^{N-1} \hat{a}_k \cdot r_k \cdot \left( \sum_{l=1}^{L} \hat{a}_{k-l} \cdot r_{k-l} \right)^* \right)$$

which can also be written $$\sum_{k=0}^{N-1} \hat{a}_k \cdot \sum_{l=1}^{L} \hat{a}_{k-l} \cdot Re(r_k \cdot r_{k-l}^*)$$

if the symbols $a_o \ldots a_{N-1}$ are real numbers. In these two expressions k−l remains between 0 and N−1. The value of L is predetermined, and is e.g. between 1 and 5.

It is obvious that as the quantity to be maximized has been truncated $$\left( \sum_{l=0}^{N-1} \right.$$

being replaced by $$\left. \sum_{l=1}^{L} \right),$$

the sequence of symbols $\hat{a}_0, \ldots, \hat{a}_{N-1}$ maximizing the simplified quantity $V(\hat{a}_0, \ldots, \hat{a}_{N-1})$ is no longer decided in an optimum manner and is instead decided in a suboptimum manner. This in particular means that the error rate of the associated receiver is higher than that of the theoretical receiver associated with the non-truncated expression. This error rate varies with L, but has an asymptotic tendency towards the rate of the optimum receiver of the general expression when L tends towards N. It is therefore important to choose a value for L which is sufficiently high in order to have an acceptable error rate.

The invention also consists of using a recursive algorithm for determining the suboptimum sequence $\hat{a}_0, \ldots, \hat{a}_{N-1}$.

More specifically the invention relates to a process for the noncoherent demodulation of a signal y(t) where each symbol $a_k$ has the same energy, said signal y(t) consisting of a signal x(t) on which is superimposed a Gaussian white noise b(t), said signal x(t) being linearly modulated by a sequence of information symbols $a_0, \ldots, a_{N-1}$ taken from an alphabet $a$, in which N is a nonzero integer, said symbols being emitted at successive dates separated by a time interval T, said signal x(t) being centered on a carrier frequency $f_0$, wherein the process comprises processing the signal y(t) to obtain N data blocks, $z_{k,k-1}, \ldots, z_{k,k-L}$, in which L is a nonzero integer and $0 \leq k \leq N-1$, said data being defined for $1 \leq l \leq L$, by $z_{k,k-l} = r_k \cdot r_{k-l}^*$ on which $r^*_{k-l}$ is the conjugate complex of $r_{k-l}$ and in which $r_0, \ldots, r_{N-1}$ is a sequence of observations containing all the information of the signal y(t), maximizing a quantity $V(\hat{a}_0, \ldots$ , $\hat{a}_{N-1}$) in which $\hat{a}_0 \ldots, \hat{a}_{N-1}$ is a sequence of symbols of the alphabet $a$, said quantity being equal to $$Re\left(\sum_{k=0}^{N-1} a_k \cdot \sum_{l=1}^{L} \hat{a}^*_{k-l} \cdot z_{k,k-l}\right)$$

in which Re signifies "real part of" and $\hat{a}^*_{k-l}$ is the conjugate complex of $\hat{a}_{k-l}$, and in which the index $k-1$ is between 0 and $N-1$, said maximization being obtained by a recursive algorithm.

According to a secondary feature of the process according to the invention, the processing of signal y(t) comprises the following successive actions:
  the complex envelope r(t) of signal y(t) is extracted,
  there is a matched filtering of the signal r(t),
  the filtered signal is sampled at N successive dates separated by a time interval T so that the observations $r_0, r_2, \ldots r_{N-1}$ are obtained,
  the L data on each of the N data blocks $z_{k,k-1}, \ldots, z_{k,k-L}$ are calculated as a function of the observations $r_0, r_2, \ldots, r_{N-1}$.

According to another secondary feature of the process according to the invention, in which the modulated signal is of the minimum shift keying or phase shift keying type, the processing of the signal y(t) comprises the following successive actions:
  a signal z(t) is produced by carrying out a pass band filtering of the signal y(t) about the carrier frequency $f_0$,
  the delayed signals $z(t-T), z(t-2T), \ldots, z(t-LT)$, are produced,
  the signals $z(t).z(t-T), z(t).z(t-2T), \ldots, z(t).z(t-LT)$ are produced,
  these signals are sampled at the same time at successive dates separated by a time interval T, so that at the kth sampling, a block of L data $z_{k,k-1}, \ldots, z_{k,k-L}$ is obtained.

According to another secondary feature of the process according to the invention, the recursive algorithm is the Viterbi algorithm.

According to another secondary feature of the process according to the invention, only a subset of states in the sense of the Viterbi algorithm is retained at each sampling date.

According to another feature of the process according to the invention, only the state whose total metric in the sense of the Viterbi algorithm is the highest is retained at each sampling date.

The invention also relates to a demodulator for performing the process according to the invention and comprising in series:
  a processing means receiving the signal y(t) and successively supplying N blocks of L data $z_{k,k-1}, z_{k,k-2}, \ldots, z_{k,k-L}$ in which $0 \leq k \leq N-1$,
  a calculating means supplying in view of the data of said N data blocks and in accordance with a recursive algorithm, a sequence of symbols $\hat{a}_0, \ldots, \hat{a}_{N-1}$ maximizing the quantity $V(\hat{a}_0, \ldots, \hat{a}_{N-1})$.

According to a preferred embodiment of the demodulator according to the invention, the processing means comprises in series:
  an oscillator means receiving at the input the signal y(t) and supplying at the output at least one signal describing the complex envelope r(t) of the signal y(t),
  a matched filter,
  a sampling means supplying observations $r_0, r_1, \ldots, r_{N-1}$, at N successive dates separated by time interval T,
  A multiplier means receiving said observations and supplying N blocks of L data $z_{k,k-1}, z_{k,k-2}, \ldots, z_{k,k-L}$ in which $0 \leq k \leq N-1$.

According to an advantageous embodiment of the demodulator according to the invention, for demodulating a signal y(t) of the minimum shift keying or phase shift keying type, the processing means comprises:
  a reception band pass filter centred on the frequency $f_0$ and supplying a signal z(t),
  L delay means in series, each supplying with a delay T the signal applied to their input, the first delay means receiving the signal z(t),
  L multipliers each for multiplying the signal z(t) by the signal supplied by one of the said L delay means,
  L low pass filters of cut-off frequency $f_0$, each being connected to the output of one of the said L multipliers,
  a sampling means receiving in parallel on L inputs, the signals from said L low pass filters and supplying, at N successive dates separated by a time interval T, a block of L data $z_{k,k-1}, z_{k,k-2}, \ldots, z_{k,k-L}$ in which $0 \leq k \leq N-1$.

According to a preferred embodiment of the demodulator according to the invention, the calculating means is able to perform a Viterbi algorithm.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

The demodulation process according to the invention is applicable to all linearly modulated signals and with energy by constant symbol, i.e. to all signals whose complex envelope is in the form $$\sum_{k=0}^{N-1} a_k \cdot g(t - kT)$$

as stated hereinbefore.

In exemplified manner, a description will be given of the demodulation process of a displaced modulation signal. This modulation is a special type of linear modulation. The complex envelope $a(t)$ is of a displaced modulation signal
has the general expression $$\sum_{k=0}^{N_1} [a_{2i} \cdot g(t - 2kT) + j \cdot a_{2k+1} \cdot g(t - (2k + 1)T)]$$

in which $$\int_{-\infty}^{+\infty} (g(t))^2 \cdot dt = E_b$$

(energy per constant symbol) and $N_1$ is the integral part of $\frac{1}{2}(N-1)$.

A minimum shift keying modulation is also defined by $$g(t) = \cos(\pi t/2T)$$

for $t \in [-T, T]$ $$a_m = (-1)^{m-1} \cdot a_{m-1} \cdot a_{m-1}$$

for m so that $1 \leq m \leq N-1$ and $a_0 = 1$ for example and by $a \in [-1, 1]$.

This modulation can also be expressed in the form of a continuous phase frequency modulation, in which $\alpha(t)$ is expressed by $$\alpha(t) = e^{j(a\frac{\pi t}{n2T} + \theta n)}$$

in which $t \in [nT, (n+1)T]$ and $\theta$ is defined by the recurrence relation $\theta_n = \theta_{n-1} + a_{n-1} \cdot (\pi/2)$.

With the following observations, $$r_{2k} = \int_{-\infty}^{+\infty} r^*(t) \cdot g(t - 2kT) \cdot dt$$

and $$r_{2k+1} = -j \int_{-\infty}^{+\infty} r^*(t) \cdot g(t - (2k + 1)T) \cdot dt,$$

the quantity $V(\hat{a}_0, \ldots, \hat{a}_{N-1})$ is written $$\sum_{k=0}^{N-1} \hat{a}_k \cdot \sum_{l=1}^{L} \hat{a}_{k-l} \cdot Re(r_k \cdot r^*_{k-l})$$

This quantity can be maximized by a recursive algorithm so that on writing $$L_K = \sum_{k=0}^{K} \hat{a}_k \cdot \sum_{l=1}^{L} \hat{a}_{k-l} \cdot Re(r_k \cdot r^*_{k-l})$$

it is possible to write $L_K = L_{K-1} + m(\hat{a}_K, \hat{S}_{K-1}, r_K \ldots, r_{K-l})$ by setting $$m(\hat{a}_K, \hat{S}_{K-1}, r_K, \ldots, r_{K-L}) = \hat{a}_K \cdot \sum_{l=1}^{L} \hat{a}_{K-l} \cdot Re(r_K \cdot r^*_{K-l})$$

in which $\hat{S}_{K-1}$ is called state at date $K-1$ and corresponds to the L-uplet $(\hat{a}_{K-1}, \ldots, \hat{a}_{K-L})$ and in which $m(\hat{a}_K, S_{K-1}, r_K, \ldots, r_{K-L})$ is called branch metric between states $\hat{S}_{K-1}$ and $\hat{S}_K$.

The expression of $L_K$ as a function of $L_{K-1}$ shows that the knowledge of the state $S_K$ is possible as from $S_{K-1}$. It is therefore possible to maximize $V(a_0, \ldots, a_{N-1})$ by a recursive algorithm. The process according to the invention advantageously uses the Viterbi algorithm, which will now be briefly described. This algorithm is described more completely in the Article "The Viterbi algorithm" by G. David Forney, Jr, which appeared in the proceedings of the IEEE, vol. 61, no. 3, March 1973, pp. 268–278.

Figure 1:
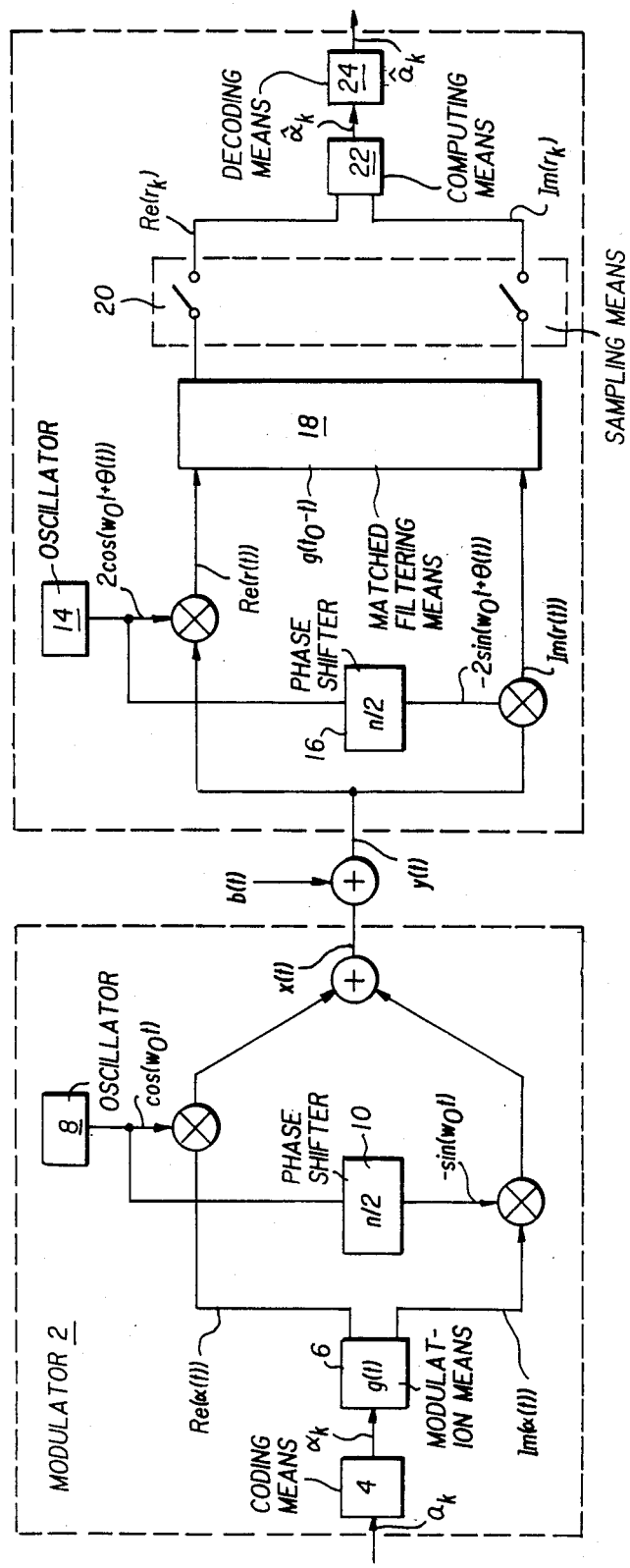
FIG. 1 already described, diagrammatically a modulation, demodulation and transmission chain of known construction.
Figure 2:
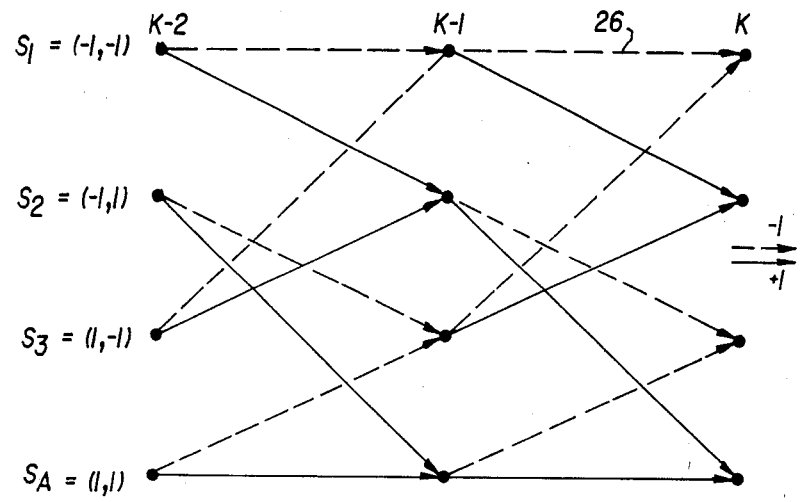
FIG. 2 a lattice used in the Viterbi algorithm used in the process according to the invention.

FIG. 2 shows a lattice illustrating the performance of the Viterbi algorithm. In general terms, said lattice has $n(\alpha)^L$ states, in which $n(\alpha)$ is the number of elements of the alphabet $\alpha$. In the particular case described, $\alpha = \{-1, 1\}$ and therefore $n(\alpha) = 2$. Moreover, as an example $L = 2$ is taken. Thus, this lattice has four possible states $S_1, S_2, S_3$, and $S_4$ at each date $K-1, K, K+1$, ...

In FIG. 2, the dotted line transitions correspond to the symbol $-1$ of the alphabet $\alpha$ and those in continuous line form correspond to the symbol $+1$ of the alphabet $\alpha$. More specifically, the line designated 26 corresponds to $\hat{a}_{K-1} = 1$ and the state designated 28 is $\hat{S}_K$. It is equal to $(\hat{a}_{K-2}, \hat{a}_{K-1})$ i.e. to $\hat{S}_1 = (-1, -1)$. A branch metric m corresponds to each transition between a state at a given date and the state at the following date. The more probable the probable corresponding transition the higher said metric. The Viterbi algorithm consists of choosing within the lattice a path, i.e. a succession of states, so that the total metric equal to the sum of the branch metrics linking two successive states of said path is at a maximum. A single path arriving at each state is retained. The path associated with each state is also called the survivor, and can be simply represented by all the successive symbols constituting it.

A description will now be given of a simplified flow chart of the Viterbi algorithm. The first stage 30 is a stage of initializing metrics, survivors and the recursiveness index K. The following stage 32 consists of sampling the filtered signal r(t), which takes place at date K.T.

Stages 34 and 36 perform the calculation of the branch metrics between dates $K-1$ and K. Stage 34 consists of calculating the terms $z_{K,K-1}, \ldots, z_{K,K-L}$ respectively equal to $Re(r_K \cdot r^*_{K-1}), \ldots, Re(r_K \cdot r^*_{K-L})$ which appear in the expression of the branch metrics. When these calculations have been carried out, stage 36 calculates the branch metrics linking each of the states at date $K-1$ with each of the states at date K.

Stage 38 then peforms a choice between the $n(\alpha)$ total metrics reaching each state at date K. For each state, the largest of these metrics is retained. The path whose metric is largest, called the survivor, is also retained.

In stage 40, the symbol $\hat{a}_{K-D}$ is decided, i.e. a value of the alphabet $\alpha$ is attributed to the symbol $\hat{a}_{K-D}$, in which D is an integer called the decision delay. This decision is made as a function of the results of stage 38. More specifically, at date K is chosen the survivor among the $n(\alpha)^L$ survivors having the largest metric. This survivor is a sequence of symbols $\ldots, \hat{a}_{K-D}, \ldots, \hat{a}_{K-L}, \ldots, \hat{a}_{K-1}, \hat{a}_K$. The value of the corresponding symbol in the chosen survivor is attributed to symbol $\hat{a}_{K-D}$.

In stage 42, it is tested whether the algorithm is ended. This is the case if K is equal to N. If K is lower than N, K is increased and stages 32, 34, 36, 38 and 40 are repeated.

Stages 34 and 36 can call for large-scale calculations, if the number $n(\alpha)$ of elements of the alphabet $\alpha$ or the number L is high. It is possible to reduce the practical complexity of the algorithm by only retaining at each date K one subset of the states of the lattice, instead of retaining all of them.

The states retained, can e.g. be those whose distance, in the Hamming sense, in the state corresponding to the largest total metric is below a predetermined value d. This known distance is equal to the sum of the different symbols between two states. For example, the Hamming distance between states $S_1$ and $S_2$ of FIG. 2 is equal to 1 and the distance between states $S_2$ and $S_3$ is equal to 2.

In another embodiment of the algorithm, only one survivor may be retained at each state K. This known procedure is called "decision in the loop".

Figure 4:
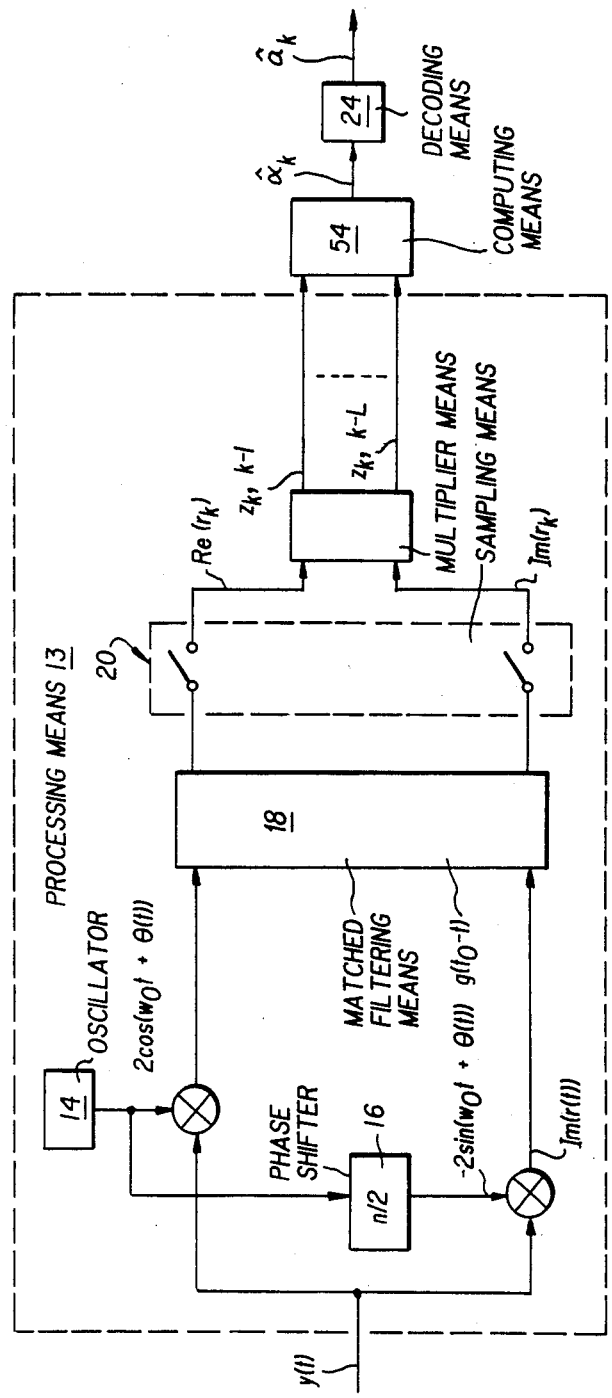
FIG. 4 a first embodiment of a demodulator according to the invention.

The demodulation process according to the invention is performed in a demodulator, whose first embodiment is shown in FIG. 4. This demodulator comprises a processing means 13, a calculating means 54 and a decoding means 24. The processing means 13 comprises an oscillator 14 and a phase shifter 16, which thus supplies two signals $2.\cos(w_0 t + \theta(t))$ and $-2.\sin(w_0 t + \theta(t))$. These signals are modulated by the signal y(t) and at the output the signals Re(r(t)) and Im(r(t)) are obtained, in which the signal r(t) is the complex envelope of the signal y(t). The signals are applied to the input of a filter 18 of pulse response $g(t_0-t)$, in which $t_0$ characterizes the duration of the transmission and g(t) is the pulse response of the emission filters of the demodulator supplying the emitted signal x(t). A sampling means 20, in series with filter 18, switched at N dates separated by a time interval T supplies the data pairs Re($r_k$) and Im($r_k$) in which $0 \leq k \leq N-1$. A multiplier means receives the data pairs and supplies blocks of L data $z_{k,k-1}, \ldots, z_{k,k-L}$ in which $0 \leq k \leq N-1$, which are received by the calculating means 54, which is able to realize the Viterbi algorithm. Calculating means 54 can in particular be a signal processing processor containing a microprogram able to realize the Viterbi algorithm. Examples of processors which can be used for calculating means 54 are uPTS of C.N.E.T., TMS 320 of Texas Instruments or NEC 7720 of National Semiconductor.

Finally, the demodulator can comprise a decoding means 24 receiving the sequence of symbols $\hat{a}_0, \ldots, \hat{a}_{N-1}$ supplied by calculating means 54 and delivering the sequence of symbols $\hat{a}_0, \ldots, \hat{a}_{N-1}$ elements of the alphabet A if, on modulation, the reverse coding was used.

Figure 5:
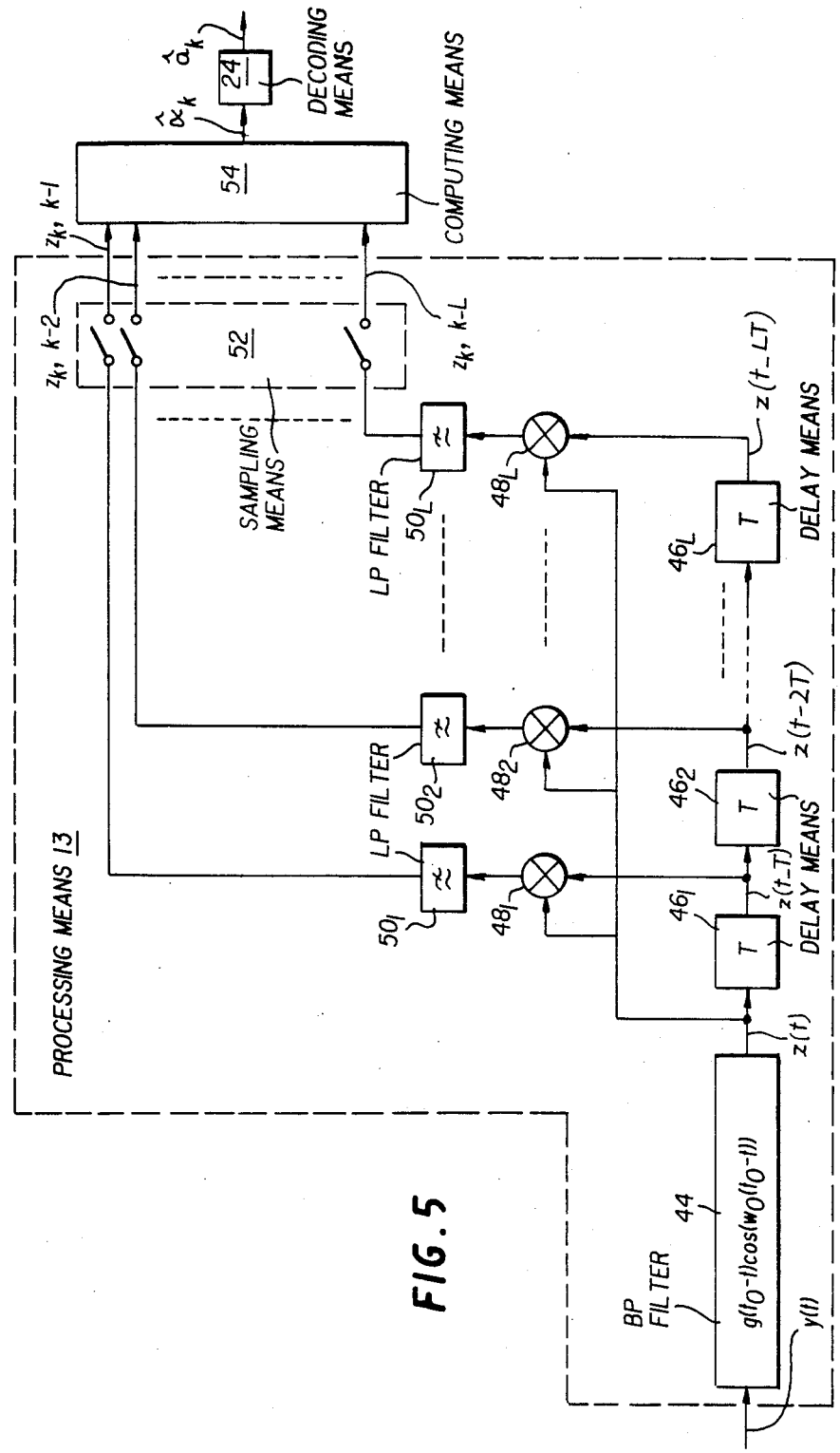
FIG. 5 a second embodiment of a demodulator according to the invention.

The demodulator according to the invention described with reference to FIG. 4 has a general structure making it possible to process all linearly modulated signals. In certain types of linear modulations, it is possible to have a simpler modulator. With reference to FIG. 5, a demodulator for signals will now be described of the minimum shift keying modulation type.

The demodulator comprises a processing means 13 receiving the signal y(t) and supplying blocks of L data $z_{k,k-1}, \ldots, z_{k,k-L}$ in which $0 \leq k \leq N-1$, a calculating means 54 and a decoding means 24. These two latter means are identical to those used in the demodulator described with reference to FIG. 4, so that they will not be described again.

Processing means 13 comprises a band pass filter 44 centred about the frequency $f_0$, which supplies a signal z(t). It then comprises L delay means $46_1, \ldots, 46_L$ in series, the first delay means $46_1$ receiving z(t). Each of these delay means delays the signal applied to its input by a time T. In the described case of a displaced modulation signal of the minimum shift keying type, said delay T is linked with the ripple $w_0$, in which $W_0 = 2\pi f_0$ by $w_0 T = \pi/2p$ in which p is an integer. The signal supplied by each delay means is modulated by the signal z(t) in multipliers $48_1, \ldots, 48_L$. At the output of each of the latter, is connected a low pass filter $50_1, \ldots, 50_L$ of cut-off frequency $f_0$. A sampling means 52 with L inputs receives in parallel the signals from said low pass filters. At N successive dates separated by a time interval T, it supplies a block of L data $z_{k,k-1}, z_{k,k-2}, \ldots z_{k,k-L}$, in which $0 \leq k \leq N-1$. The data are then supplied to the L inputs of the calculating means 54.

It should be noted that the demodulator can be used for phase shift keying modulation signals. It is merely necessary to replace the delay T of each delay means by a delay T' proving $w_0 T' = 2p\pi$ in which p is an integer.

Figure 6:
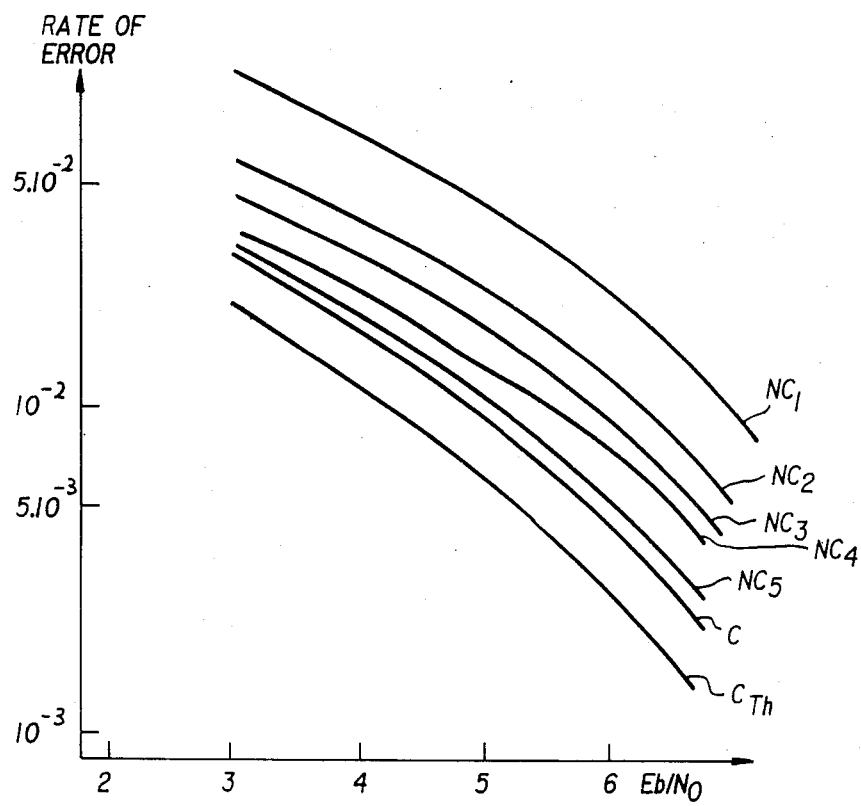
FIG. 6 a graph illustrating the performance characteristics of the process according to the invention.
Figure 3:
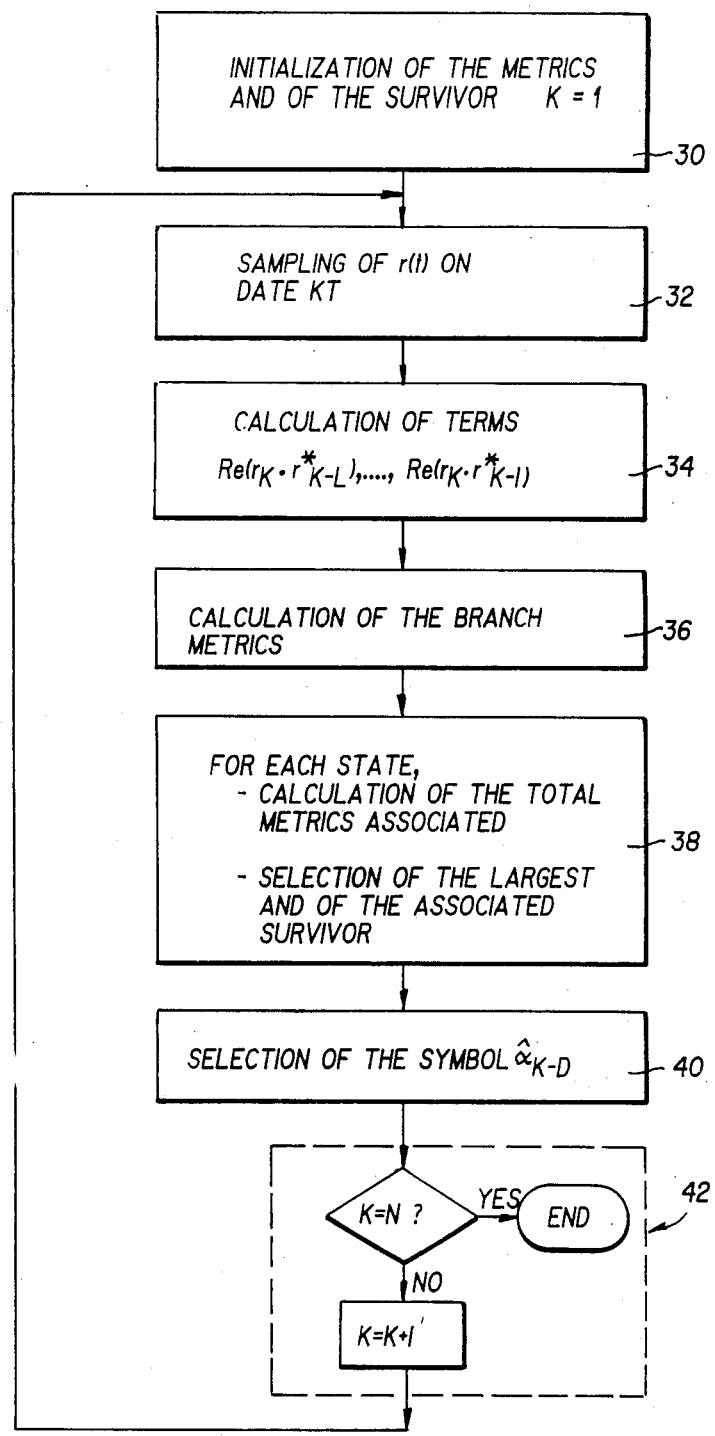
FIG. 3 a simplified flow chart of the Viterbi algorithm used in the process according to the invention.

FIG. 6 is a graph illustrating the performance characteristics of the demodulation process according to the invention. On the abscissa appears the energy ratio per bit ($E_b$) at the monolateral spectral density $N_0$ on the transmission channel, said quantity being measured in watt/hertz. On the ordinate, on a semilogarithmic axis, appears the error rate at reception.

The curves are demodulation performance curves of a linearly modulated signal with minimum shift keying. The noncoherent demodulation has been realized by a receiver using the Viterbi algorithm.

Curve $C_{TH}$ corresponds to a theoretical coherent receiver and constitutes the optimum curve. The following curve C corresponds to a coherent receiver simulated by the same transmission chain and curves $NC_1, \ldots, NC_5$ corresponds to various noncoherent receivers according to the invention. The index of each curve NC represents the value of variable L. It can be seen that with a value L equal to 5, a noncoherent receiver is obtained, whose performance characteristics are close to those of a conventional coherent receiver.

What is claimed is:

1. A process for the noncoherent demodulation of a signal y(t), said signal y(t) consisting of a signal x(t) on which is superimposed a Gaussian white noise b(t), said signal x(t) being linearly modulated by a sequence of information symbols $a_0, \ldots, aN-1$ taken from an alphabet $a$, in which N is a nonzero integer, said symbols being emitted at successive dates separated by a time interval T, said signal x(t) being centered on a carrier frequency $f_0$, wherein the process comprises processing the signal y(t) to obtain N data blocks, $z_{k,k-1}, \ldots, z_{k,k-L}$, in which L is a non-zero integer and $0 \leq k \leq N-1$, said data being defined for $1 \leq l \leq L$, by $z_{k,k-l} = r_k \cdot r_{k-l}^*$ on which $r^*_{k-l}$ is the conjugate complex of $r_{k-l}$ and in which $r_0, \ldots, r_{N-1}$ is a sequence of observations containing all the information of the signal y(t), maximizing a quantity $V(\hat{a}_0, \ldots, \hat{a}_{N-1})$ in which $\hat{a}_0, \ldots, \hat{a}_{N-1}$ is a sequence of symbols of the alphabet $a$, said quantity being equal to $$Re\left(\sum_{k=0}^{N-1} a_k \cdot \sum_{l=1}^{L} \hat{a}^*_{k-l} \cdot z_{k,k-l}\right)$$

in which Re signifies "real part of" and $\hat{a}^*_{k-l}$ is the conjugate complex of $\hat{a}_{k-l}$, and in which the index $k-l$ is between 0 and $N-1$, said maximization being obtained by a recursive algorithm.

2. A process according to claim 1, wherein the processing of the signal y(t) comprises the following successive actions:

the complex envelope r(t) of the signal y(t) is extracted, there is a matched filtering of the signal r(t), the filtered signal is sampled at N successive dates separated by a time interval T so that the observations $r_0, r_2, \ldots, r_{N-1}$ are obtained, the L data on each of the N data blocks $z_{k,k-1}, \ldots, z_{k,k-L}$ are calculated as a function of the observations $r_0, r_2, \ldots, r_{N-1}$.

3. A process according to claim 1, in which the modulated signal is of the minimum shift keying or phase shift keying type, wherein the processing of the signal y(t) comprises the following successive actions;

a signal z(t) is produced by carrying out a pass band filtering of the signal y(t) about the carrier frequency $f_0$, the delayed signals $z(t-T), z(t-2T), \ldots, z(t-Lt)$ are produced, the signals $z(t).z(t-T), z(t).z(t-2T), \ldots, z(t).z(t-LT)$ are produced, these signals are sampled at the same time at successive dates separated by a time interval T, so that at the kth sampling a block of L data $z_{k,k-1}, \ldots, z_{k,k-L}$ is obtained.

4. A process according to claim 1, wherein the recursive algorithm is the Viterbi algorithm.

5. A process according to claim 4, wherein only one subset of states in the sense of the Viterbi algorithm is retained at each sampling date.

6. A process according to claim 5, wherein only the state whose total metric, in the sense of the Viterbi algorithm is largest is retained at each sampling date.

7. A demodulator for the noncoherent demodulation of a received signal y(t) to retrieve a sequence of emitted information symbols $a_0, a_1, \ldots, a_{N-1}$ taken from an alphabet $a$ in which N is a non-zero integer, said symbols being made to modulate a carrier signal at successive dates separated by a time interval T to create an emitted signal x(t), said received signal y(t) being a combination of said emitted signal x(t) and of a white Gaussian noise signal b(t), wherein said demodulator comprises in series:

a processing means receiving said signal y(t) and successively supplying N blocks of L data $z_{k,k-1}, z_{k,k-2}, \ldots, z_{k,k-L}$ in which $0 \leq k \leq N-1$, in which each data is a product of samples of demodulated signal y(t), a calculating means supplying in view of the data of said N data blocks and in accordance with a recursive algorithm, a sequence of symbols $\hat{a}_0, \ldots, \hat{a}_{N-1}$ maximizing $$Re\left(\sum_{k=0}^{N-1} a_k \cdot \sum_{l=1}^{L} a_{k-l} \cdot z_{k,k-l}\right),$$

said sequence of symbols $\hat{a}_0, \hat{a}_1, \ldots, \hat{a}_{N-1}$ being identified as the sequence of emitted symbols $a_0, a_1, \ldots, a_{N-1}$.

8. A demodulator according to claim 7, wherein the processing means comprises in series:

an oscillator means receiving at the input said signal y(t) and supplying at the output at least one signal corresponding to a complex envelope r(t) of said signal y(t), a matched filter, a sampling means supplying, sampling values of signal r(t), or observations, $r_0, r_1, \ldots, r_{N-1}$, at N successive dates separated by time interval T, a multiplier means receiving said observations and supplying N blocks of L sequences of data $z_{k,k-1}, z_{k,k-2}, \ldots, z_{k,k-L}$, in which $0 \leq k \leq N-1$, and $z_{k,k-2} = r_k \cdot r^*_{k-l} (1 \leq l \leq L)$, $r^*_{k-l}$ being the complex conjugate of $r_{k-l}$.

9. A demodulator according to claim 7 for demodulating a signal y(t) of the Minimum Shift Keying or Phase Shift Keying type, wherein the processing means comprises:

a reception band pass filter centered on the frequency of the carrier signal used on emission side, and supplying a signal z(t), L delay means in series, each supplying with a delay T the signal applied to their input, the first delay means receiving the signal z(t), L multipliers each for multiplying the signal z(t) by the signal supplied by a respective one of said L delay means, L low pass filters with cut-off frequency equal to the frequency of the carrier signal used on the emission side, each low pass filter being connected to the output of one of the said L multipliers, a sampling means receiving in parallel on L inputs the signals from said L low pass filters and supplying a N successive dates separated by a time interval T, a block of L data $z_{k,k-1}, z_{k,k-2}, \ldots, z_{k,k-L}$ in which $0 \leq k \leq N-1$.

10. A demodulator according to claim 7, wherein the calculating means is able to realize a Viterbi algorithm.

* * * * *